United States Patent [19]

Lee

[11] Patent Number: 5,835,365
[45] Date of Patent: Nov. 10, 1998

[54] ALTERNATING CURRENT INRUSH LIMITING CIRCUIT

[75] Inventor: Kyung-Sang Lee, Suwon, Rep. of Korea

[73] Assignee: SamSung Electronics Co., Ltd., Suwon, Rep. of Korea

[21] Appl. No.: 760,562

[22] Filed: Dec. 4, 1996

[30] Foreign Application Priority Data

Dec. 5, 1995 [KR] Rep. of Korea ................... 1995 46782

[51] Int. Cl.[6] .............................. H02M 1/14; H02M 5/42; H02H 7/122; H02H 7/06

[52] U.S. Cl. ............................... 363/49; 363/95; 323/901; 323/908

[58] Field of Search .................................. 363/49, 50, 95, 363/97, 100; 323/901, 908

[56] References Cited

U.S. PATENT DOCUMENTS

| | | | |
|---|---|---|---|
| 4,494,064 | 1/1985 | Harkness | 323/908 |
| 4,621,313 | 11/1986 | Kiteley | 323/908 |
| 4,628,431 | 12/1986 | Kayser | 363/49 |
| 4,910,654 | 3/1990 | Forge | 323/908 |
| 5,187,653 | 2/1993 | Lorenz | 323/908 |
| 5,257,156 | 10/1993 | Kirkpatrick | 361/18 |
| 5,287,263 | 2/1994 | Shilo | 323/908 |
| 5,499,184 | 3/1996 | Squibb | 363/100 |
| 5,519,264 | 5/1996 | Heyden et al. | 323/908 |

*Primary Examiner*—Peter S. Wong
*Assistant Examiner*—Bao Q. Va
*Attorney, Agent, or Firm*—Robert E. Bushnell, Esq

[57] ABSTRACT

A power supply control circuit is provided for preventing sudden inrush current which is produced when a power switch of an electronic device is turned on. The power supply control circuit includes a main power supply which receives an alternating current (AC) voltage and supplies a first predetermined voltage to a system and outputs a second predetermined voltage independent of an amplitude of the AC voltage, a subsidiary power supply which receives the second predetermined voltage and outputs a power voltage; and a controller which is operated by the power voltage and outputs a switch control signal to control a flow of the first predetermined voltage of the main power supply.

17 Claims, 3 Drawing Sheets

ALTERNATING CURRENT INRUSH LIMITING CIRCUIT

CLAIM OF PRIORITY

This application makes reference to, incorporates the same herein, and claims all benefits accruing under 35 U.S.C. §119 from an application for A POWER SUPPLY CONTROL CIRCUIT earlier filed in the Korean Industrial Property Office on the 5$^{th}$ day of Dec. 1995 and there duly assigned Ser. No. 46782/1995.

BACKGROUND OF THE INVENTION

1. Field of the Invention

The present invention relates to power supply control processes and circuits generally, and more particularly to power supply control processes and circuits for preventing a sudden inrush current from occurring when a power switch of an electronic device is turned on.

2. Description of the Related Art

Early designs for computer systems relied upon input devices for feeding data to the computer system, output devices for reading the data which is manipulated in the computer system, memories for storing the data and programs for manipulating the data, and a central processing unit (CPU) for controlling the operational performance of the computer system. The central processing unit included a control unit that operated the computer system and a processing unit that operated upon and manipulated the data according to an algorithm administered by the computer system.

Power supplies for early designs of computer systems relied upon a power supply unit and a power supply switch to control distribution of electrical energy from the power supply unit to the computer system. The power supply unit was typically constructed with a first filter, a thermistor, a rectifier, a second switch, one or more capacitors, a transformer, a second filter, and the second rectifier. When the power supply switch was turned on, an alternating current passed through the first filter, and the first filter to remove noise from the alternating current. A thermistor is frequently used in an effort to suppresses an inrush of electrical current produced when the power supply switch is turned on. I have noticed that the inrush of electrical current is produced because the capacitors are in a discharged state at the time of the power being turned on. A conventional bridge rectifier rectifies the output voltage from the thermistor. A second switch is operated according to the alternating current, (AC) voltage amplitude and the capacitors are used in an effort to supply a constant voltage that is independent of the AC voltage amplitude supply to the computer system. A transformer receives the output voltage of the capacitors across its primary winding, and transforms that voltage into a predetermined voltage across its secondary winding. A second filter removes noise from the output voltage of the transformer, while a second rectifier supplies voltage from the second filter to the computer system. I have noticed that because the capacitors are discharged when the power of the computer system is off, the undesirable inrush current is not fully prevented with only a thermistor, and faulty operation of the computer system or damage to the power supply results. This may cause more serious problems when the power switch is turned on or off more frequently. Therefore, in my opinion, a power supply circuit able to prevent the inrush current is needed.

Early efforts in the art, represented by Harkness, U.S. Pat. No. 4,494,064, entitled Direct Current Inrush Limiting Circuit, sought to provide a circuit which includes a main power supply and a subsidiary power supply and a controller. As shown in FIG. 1a of Harkness and mentioned in the paragraph beginning on line 50 of column 4 of Harkness'064, the main power supply uses, in fact, a direct current source of power rather than a main power supply, an unnecessarily expensive source of electrical energy. Other efforts in the art, represented by the following additional patents, appear to fail to effectively and reliably ameliorate the common adverse affects of the sudden application of electrical power: U.S. Pat. No. 4,628,431 to Kayser, entitled Power Supply On/Off Switching With Inrush Limiting, U.S. Pat. No. 4,910,654 to Forge, entitled Current Limiting Scheme for The AC Input Circuit To A Switch Mode Power Supply, U.S. Patent No. 5,257,156 to Kirkpatrick, entitled Turn-On Transient Overcurrent Response Suppressor and U.S. Patent No. 52,87,263 to Shilo, entitled Inrush Current Control Circuit.

SUMMARY OF THE INVENTION

It is therefore, one object of the present invention to provide an improved circuit and process for supplying electrical energy to computers.

It is another object to provide power supply control processes and circuits for preventing a sudden inrush of electrical current from occurring when a power switch of an electronic device is turned on.

It is still another object to provide power supply control processes and circuits able to effectively and reliably ameliorate adverse affects of the sudden application of electrical power to an electrical appliance.

These and other objects may be achieved with a power supply control circuit using a main power supply that receives an alternating current (AC) voltage and supplies a first predetermined voltage to a system and outputs a second predetermined voltage independent of the amplitude of the AC voltage; a subsidiary power supply which receives the second predetermined voltage and outputs a power voltage; and a control means which is operated with the power voltage and outputs a switch control signal to control a flow of the first predetermined voltage of the main power supply.

In one embodiment of these principles, a main power supply may be constructed with a first filter that receives the AC voltage and filters out noise therefrom; a thermistor which is connected to the first filter and suppresses an inrush current of the AC voltage; a first rectifier which rectifies an output voltage of the thermistor; first and second capacitors which are serially connected between the first rectifier and ground, a first node being formed between the first capacitor and first rectifier; a first switching means whose one end is connected to the first rectifier and whose other end is connected to a second node formed between the first and second capacitors, the first switching means being operated according to the amplitude of the AC voltage, for changing a voltage of the first node to the second predetermined voltage which is independent of the amplitude of the AC voltage; a second switching means which is connected to the first node, and controls a current flow to the computer system according to the switch control signal; a first transformer which is connected to the second switching means, for transforming the second predetermined voltage into the first predetermined voltage; a second filter which filters out noise from the first predetermined voltage; and a second rectifier which rectifies the first predetermined voltage.

Another power supply control circuit constructed as an embodiment of these principles may be constructed with an input terminal which receives an AC voltage; a plurality of capacitors which are serially connected between the input terminal and ground; a plurality of first switching means which control operations of the plurality of capacitors respectively according to the amplitude of the AC voltage so that a constant voltage flows to a computer system; and a second switching means which is connected to the input terminal and receives the constant voltage and control a flow of the constant voltage to the computer system according to a user's control.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
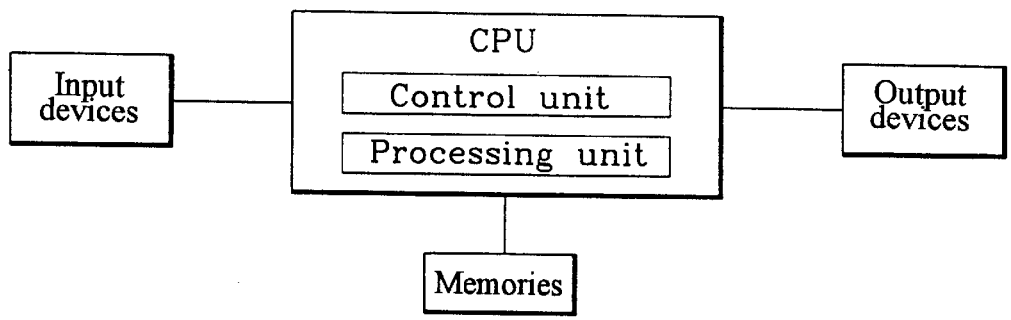
FIG. 1 is a block diagram of an abstract representation of a hypothetical design for an earlier computer system.

As shown in FIG. 1, an earlier computer system constructed with input devices for inputting data to the computer system, output devices for outputting the data which is manipulated in the computer system, memories for storing the data and programs for manipulating the data, and a central processing unit (CPU) for controlling the computer system. The central processing unit comprises a control unit which operates the computer system and a processing unit which manipulates the data.

Figure 2:
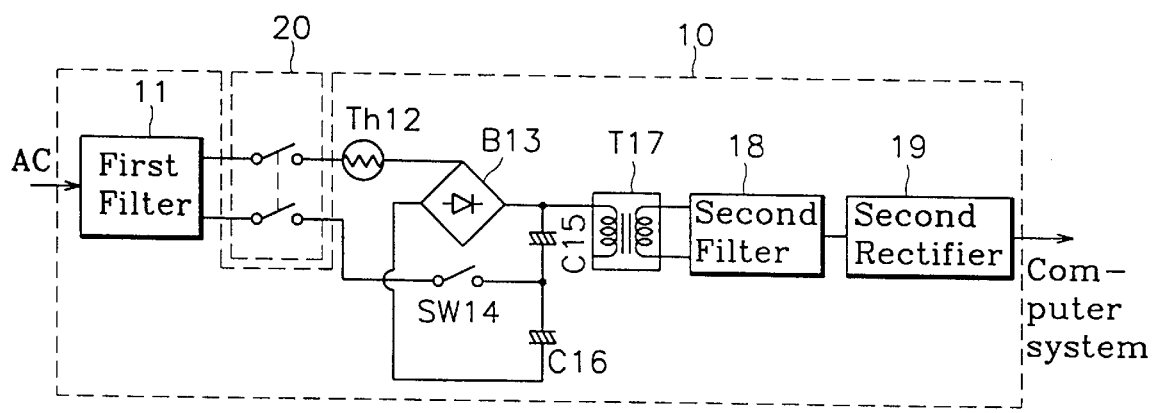
FIG. 2 is a detailed schematic block diagram of an earlier power supply for the computer system.

As shown in FIG. 2, an earlier power supply for the computer system comprises a power supply unit 10 and the first switch 20 to control the power supply unit 10. The power supply unit 10 comprises a first filter 11, a thermistor Th12, a rectifier B13, a second switch SW14, first and second capacitors C15 and C16, a transformer T17, a second filter 18, and the second rectifier 19. When the first switch 20 is turned on, an AC voltage passes through the first filter 11, and the first filter 11 filters out noise from the inputted AC voltage; the thermistor Th12 is provided for suppressing an inrush current which is produced when the first switch 20 is turned on. The inrush current is produced because the capacitors C15 and C16 are in a discharged state at the time of the power being turned on. The rectifier B13 is a conventional bridge rectifier, and is provided for rectifying the output voltage of the thermistor Th12. The second switch SW14 is operated according to the amplitude of the AC voltage, and the first and second capacitors C15 and C16 are provided to supply a constant voltage which is independent of the amplitude of the inputted AC voltage to the computer system, and this operation is controlled by the second switch SW14. The transformer T17, having primary and secondary windings, receives the output voltage of the capacitors C15 and C16 across the primary winding, and transforms it to a predetermined voltage, and outputs it from the secondary winding. The second filter 18 filters out noise from the output voltage of the transformer T17, and the second rectifier 19 rectifies the output voltage of the second filter 18 and supplies it to the computer system.

Since the capacitors C15 and C16 are discharged however, when the power of the computer system is off, the undesirable inrush current is not fully prevented only with the thermistor Th12, and results in misoperation of the computer system or damage to the power supply. This disadvantage may cause more serious problems when the power switch is turned on or off more frequently. Therefore, a power supply circuit which can prevent the inrush current is needed.

Figure 3:
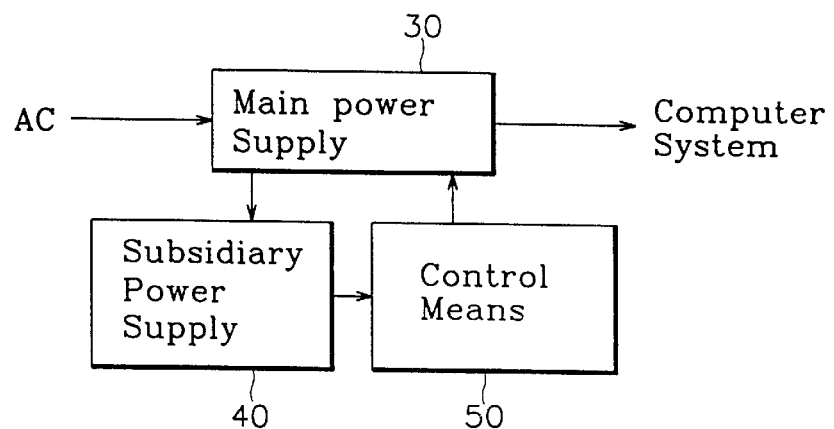
FIG. 3 is a block diagram of one embodiment of a power supply constructed according to the principles of the present invention.
Figure 4:
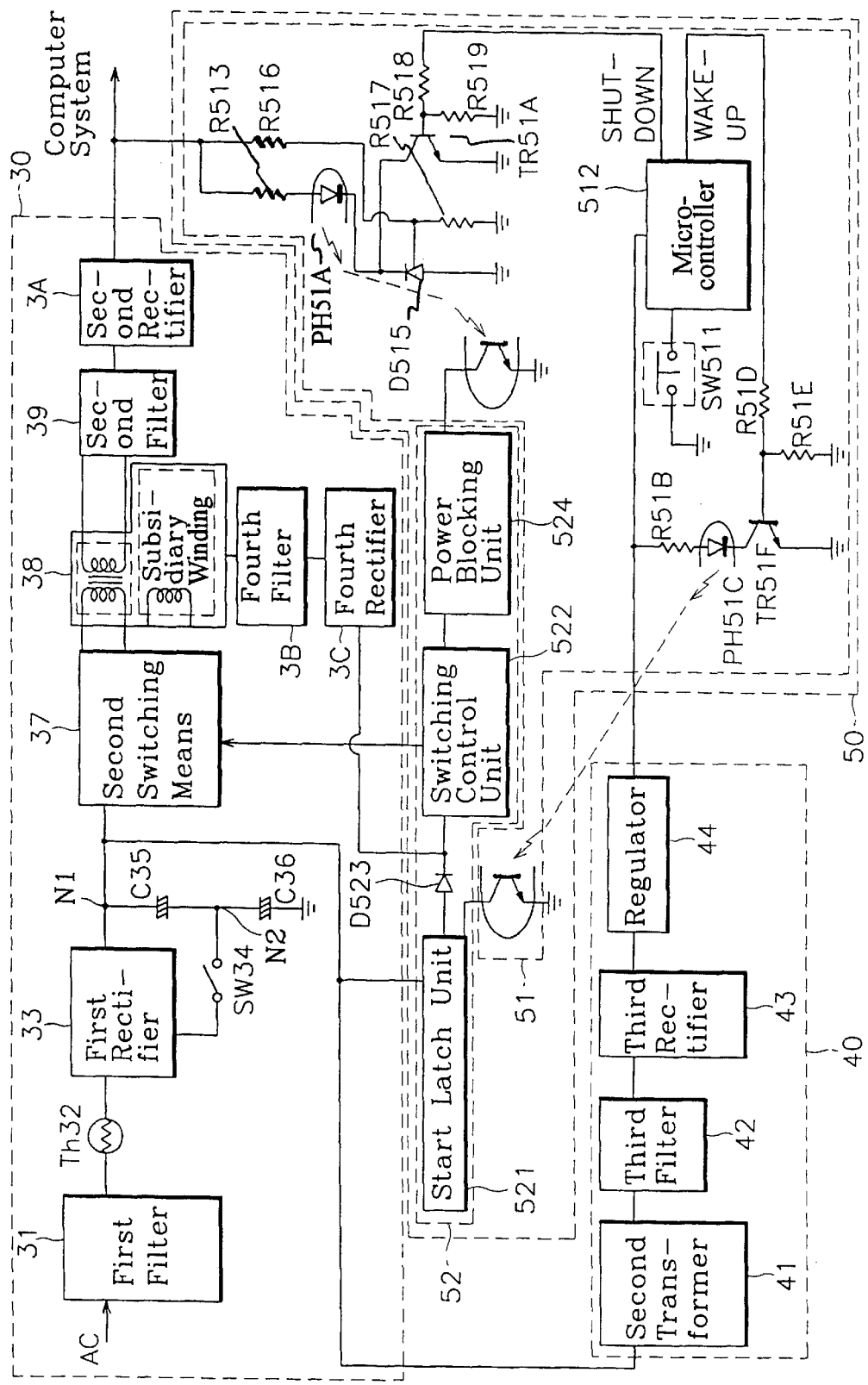
FIG. 4 is a detailed schematic circuit diagram of an alternative embodiment of a power supply constructed according to the principles of the present invention.

As shown in FIGS. 3 and 4, the power supply control circuit according to the present invention comprises a main power supply 30, a subsidiary power supply 40 and a control means 50. The main power supply 30 receives an AC voltage and supplies a first predetermined voltage to a computer system and outputs a second predetermined voltage independent of the amplitude of the AC voltage. The subsidiary power supply 40 receives the second predetermined voltage and outputs a power voltage, and the control means 50 is operated with the power voltage and outputs a switch control signal to control a flow of the first predetermined voltage of the main power supply.

The main power supply 30 comprises a first filter 31, a thermistor Th32, a first rectifier 33, first and second capacitors C35 and C36, a first switching means SW34, a second switching means 37, a first transformer 38, a second filter 39, and a second rectifier 3A.

Now the operation of the main power supply 30 according to an embodiment of this invention will be described. When the AC voltage is supplied to the first filter 31 of the main power supply 30, the first filter 31 filters out noise from the AC voltage. The thermistor Th32 suppresses the inrush current which is produced due to the sudden input of the AC voltage to the discharged capacitors C35 and C36. The first rectifier 33 rectifies the AC voltage and supplies it to the capacitors C35 and C36. The first and second capacitors C35 and C36 are serially connected between the first rectifier 33 and ground, wherein a first node N1 is formed between the first capacitor C35 and first rectifier 33. The first switching means SW34 has one end connected to the first rectifier 33 and has another end connected to a second node N2 formed between the first and second capacitor C35 and C36. The operation condition of the first switching means SW34 is changed according to the amplitude of the AC voltage, and changes a voltage of the first node N2 to the second predetermined voltage which is independent of the amplitude of the AC voltage. In other words, the first and second capacitors C35 and C36 are provided to supply a constant voltage independent of the amplitude of the inputted AC voltage, and their operations are controlled according to the operation of the first switch SW34. The constant output voltage of the capacitors C35 and C36 is supplied to the start latch unit 521 of the second control unit 52, so that the start latch unit 521 can supply the power to the switching control unit 522. The switching control unit 522 controls the second switching means 37 to supply the voltage from the capacitors C35 and C36 to the first transformer 38. The first transformer 38, having primary and secondary windings, transforms the inputted voltage to the first predetermined voltage, and outputs it from the secondary winding. The second filter 39 filters out noise from the output voltage of the first transformer 38, and the second rectifier 3A rectifies the output voltage of the second filter 39 and supplies it to the computer system.

The subsidiary power supply 40 comprises a second transformer 41, a third filter 42, a third rectifier 43 and a regulator 44. The second transformer 41 receives the second predetermined voltage and transforms it to a third predetermined voltage, and the third filter 42 filters out noise from the third predetermined voltage. The third rectifier 43 rectifies an output of the third filter, and the regulator 44 regulates an output of the rectifier and outputs the power voltage to the control means 50.

As shown in FIG. 4, the control means 50 comprises a first control unit 51 which receives the power voltage and outputs first and second control signals according to a user's control, and the second control unit 52 which outputs the switch control signal according to an output of the first control unit 51. In detail, the first control unit 51 comprises a third switching means SW511, a microcontroller 512, a first photocoupler PH51A, and a second photocoupler PH51C. The second control unit 52 comprises the start latch unit 521, a power blocking unit 524, the switching control unit 522 and a diode D523. The photocouplers each include a light emitting diode and a phototransistor. The third switching means SW511 works according to the user's control, and the microcontroller 512 receives the power voltage and outputs a shut-down signal SHUT-DOWN and an wake-up signal WAKE-UP according to outputs of the third switching means SW511. In this embodiment, the third switching means SW511 is a push-button switch.

When the computer system is not in use, a user operates the pushbutton switch SW511 to turn the computer system off (suspend mode). The microcontroller 512 receives a signal from the push-button switch SW511, and produces a shut-down signal SHUT-DOWN to turn off the second switching unit 37 of the main power supply 30. The shut-down signal SHUT-DOWN turns on the first transistor TR51A, causing a current to flow to the light emitting diode of the first photocoupler PH51A, thereby causing the first phototransistor of the first photocoupler PH51A to be turned on by the light which is emitted by the first light emitting diode. The first phototransistor triggers power blocking unit 524; the power blocking unit 524 controls the switching control unit 522 to cut off the power of main power supply 30. Even though the power is not supplied to the computer system, the inputted rectified AC voltage is still supplied to the capacitors C35 and C36, and keep the capacitors C35 and C36 in a charged condition. The subsidiary power supply 40 supplies power to the first control unit 51 to keep the first control unit 51 in a stand-by state. In the stand-by state, the first control unit 51 waits for a user's command to supply the power to the computer system. In this stand-by state, if the pushbutton switch SW511 is triggered, the main power supply 30 is turned on without an inrush current. In detail, when the pushbutton switch SW511 is triggered, the microcontroller 512 receives a signal from the pushbutton switch SW511, and outputs a wake-up signal WAKE-UP. Then the second transistor TR51F is turned on by the wake-up signal WAKE-UP. A current from the subsidiary power supply 40 flows to the light emitting diode of the second photocoupler PH51C, thereby causing the second phototransistor of the second photocoupler PH51C to be turned on by the light which is emitted by the second light emitting diode. The phototransistor resets the start latch unit 521; the start latch unit 521 then supplies power to the switching control unit 522 to turn on the second switching means 37. The first transformer 38, having primary and secondary windings, transforms the inputted voltage to the first predetermined voltage, and outputs it from the secondary winding. The second filter 39 filters out noise from the output voltage of the first transformer 38, and the second rectifier 3A rectifies the output voltage of the second filter 39 and supplies it to the computer system. As described above, since the first and second capacitors C35 and C36 are always in a charged state regardless of the conditions of the main power supply 30, the inrush current is not produced in the power supply of this invention. In this state, power is supplied from the subsidiary winding of the first transformer 38 to the switching control unit 522. As shown in FIG. 4, a fourth filter 3B and a fourth rectifier 3C can be provided to filter and rectify the power from the subsidiary winding. If the power is supplied from the first transformer 38 to the switching control unit 522, the start latch unit 521 does not supply the power to the switching control unit 522 by its latching operation. That is, the switching control unit 522 receives a subsidiary power from the subsidiary winding of the first transformer 38 instead of the power from the start latch unit 521 when the first switching means 37 is turned on. The diode D523 is provided for preventing a current flow from the first transformer 38 to the start latch unit 521.

In this embodiment, the push button switch SW511 is used to control the microcontroller, but other devices, such as a light sensor and remote controller, can be used as the switch SW511. The power supply control circuit of this invention can prevent the undesirable inrush current which is produced when a power switch of an electronic device is turned on, and thereby prevents the misoperation of the electronic device or damage to the power supply thereof The power supply control circuit of this invention can be adapted to all electronic devices having a power supply, preferably to a computer system.

Figure 5:
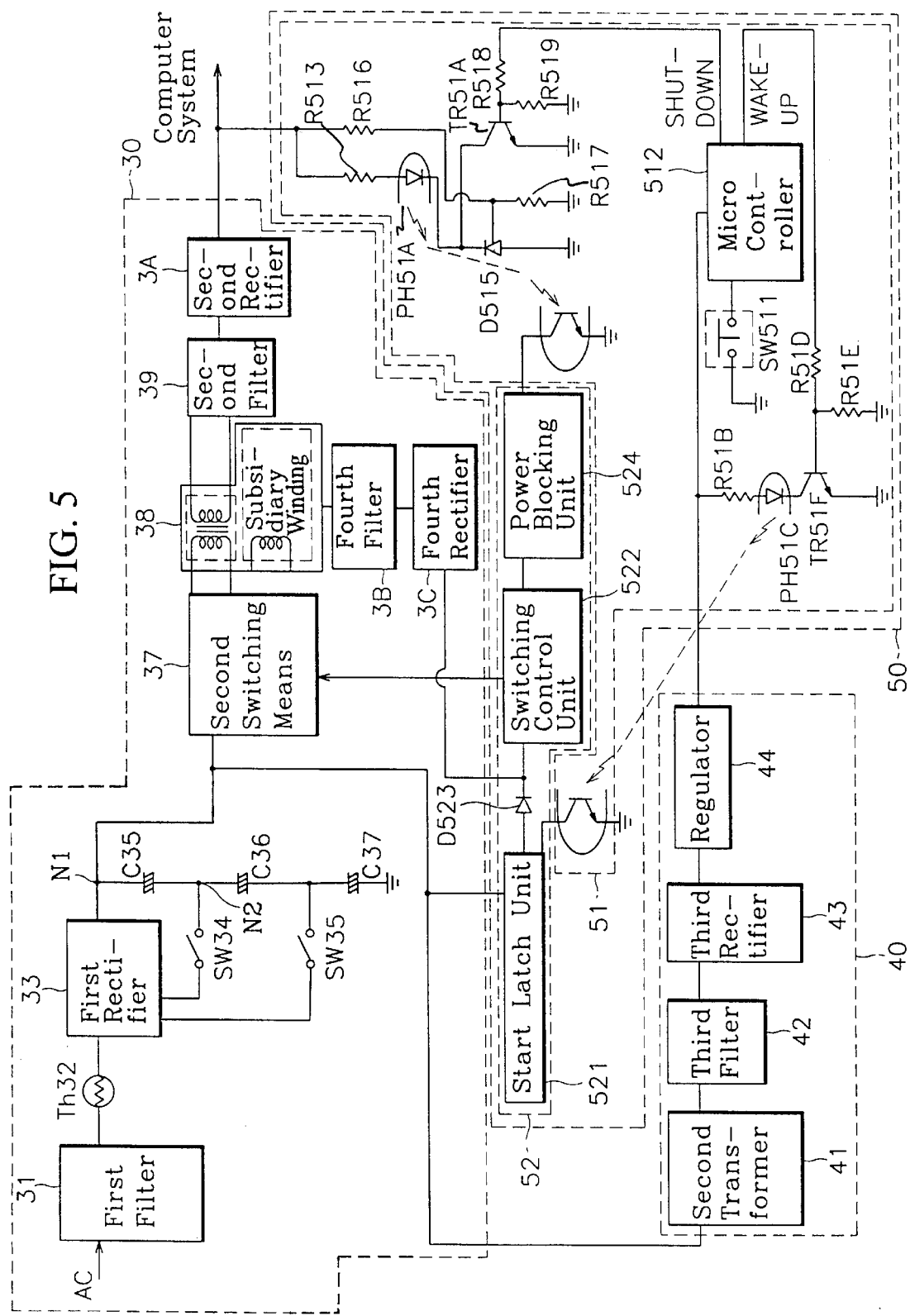
FIG. 5 is a detailed schematic circuit diagram of an alternative embodiment of a power supply constructed according to the principles of the present invention.

FIG. 5 is a modified version of the power supply of FIG. 4 and differs from FIG. 4 in that an additional switch SW35 and capacitor C37 have been added. These additional components provide a greater range of control of the voltage at node N1. Further additional switches and capacitors may be added to further increase the range.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power supply control circuit for supplying electrical power to a system, the circuit comprising:

a main power supply for receiving an AC voltage and for suppling a first predetermined voltage to the system and for outputting a second predetermined voltage, the first and second predetermined voltages being constant and independent of an amplitude of the AC voltage input thereto and are outputted independent of a user's control;

a subsidiary power supply for receiving the second predetermined voltage and for outputting a power voltage; and a controller, supplied with electrical power from the power voltage, for outputting a switch control signal to the main power supply according to a user's control for controlling a flow of the first predetermined voltage to the system.

2. The power supply control circuit according to claim 1, the main power supply comprising:

a first filter for filtering noise from the AC voltage;

a thermistor, connected to the first filter, for suppressing an inrush current of the AC voltage;

a first rectifier for rectifying an output voltage of the thermistor;

first and second capacitors, serially connected between the first rectifier and ground, a first node being disposed between the first capacitor and the first rectifier and a second node being disposed between the first and second capacitors;

a first switching means connected between the first rectifier and the second node, the first switching means being operated according to the amplitude of the AC voltage, and changing a voltage of the first node to the second predetermined voltage such that the second predetermined voltage is independent of the amplitude of the AC voltage;

a second switching means, connected to the first node, and for controlling a current flow to the system according to the switch control signal;

a first transformer, connected to the second switching means, and for transforming the second predetermined voltage into the first predetermined voltage;

a second filter for filtering out noise from the first predetermined voltage; and a second rectifier for rectifying the first predetermined voltage.

3. The power supply control circuit according to claim 1, the subsidiary power supply comprising:

a first transformer for receiving the second predetermined voltage and for transforming it to a third predetermined voltage;

a first filter for filtering out noise from the third predetermined voltage;

a first rectifier for rectifying an output of the first filter; and a regulator for regulating an output of the first rectifier and for outputting the power voltage.

4. The power supply control circuit according to claim 1, the controller comprising:

a first control unit for receiving the power voltage and for outputting first and second control signals according to a user's control; and a second control unit for outputting the switch control signal according to an output of the first control unit.

5. The power supply control circuit according to claim 4, the first control unit comprising:

a first switching means for providing an output according to the user's control;

a microcomputer for receiving the power voltage and for outputting a shut-down signal and an wake-up signal according to an output of the first switching means;

a first light emitting diode which is turned on and emits light in response to the microcomputer outputting the shut-down signal;

a first phototransistor for outputting the first control signal according to an emitted light output of the first light emitting diode;

a second light emitting diode which is turned on and emits light in response to the microcomputer outputting the wake-up signal;

a second phototransistor for outputting the second control signal according to an emitted light output of the second light emitting diode.

6. The power supply control circuit according to claim 4, the second control unit comprising:

a start latch unit, connected to a first node of the main power supply, for outputting a power according to the second control signal;

a power blocking unit for blocking the power according to the first control signal;

a switching control unit for outputting the switch control signal according to the power selectively outputted from the start latch unit; and a diode for preventing a reverse current from flowing from the switch control unit to the start latch unit.

7. The power supply control circuit according to claim 6, further comprising a subsidiary winding of a first transformer, the switching control unit selectively receiving subsidiary power from the subsidiary winding of the first transformer instead of power from the start latch unit when a switching means is turned on.

8. The power supply control circuit according claim 5, the third switching means comprising a pushbutton switch.

9. A power supply control circuit for supplying electrical power to a system, the circuit comprising:

an input terminal for receiving an AC voltage;

a plurality of capacitors, serially connected between the input terminal and ground;

a plurality of first switching means for respectively controlling interconnections of the plurality of capacitors according to an amplitude of the AC voltage so that a constant voltage flows to the system;

a second switching means, connected to the input terminal, for receiving the constant voltage and for controlling a flow of the constant voltage to the system according to user's control; and a controller, supplied with electrical power of a constant voltage, for controlling the second switching means according to a user's control.

10. A power supply control circuit for supplying electrical power to a system, the circuit comprising:

a main power supply for receiving an AC voltage and for supplying a first predetermined voltage to the system and for outputting a second predetermined voltage via at least one capacitor, the first and the second predetermined voltages being constant and independent of an amplitude of the AC voltage input thereto, and are outputted independent of a user's control;

a subsidiary power supply for receiving the second predetermined voltage and for outputting a power voltage; and a controller, supplied with electrical power from the power voltage, for outputting a switch control signal to the main power supply according to user's control for controlling a flow of the first predetermined voltage to the system.

11. The power supply control circuit according to claim 10, the main power supply comprising:

a first filter for filtering noise from the AC voltage;

a thermistor, connected to the first filter, for suppressing an inrush current of the AC voltage;

a first rectifier for rectifying an output voltage of the thermistor;

first and second capacitors, serially connected between the first rectifier and ground, a first node being disposed between the first capacitor and the first rectifier and a second node being disposed between the first and second capacitors;

a first switching means connected between the first rectifier and the second node, the first switching means being operated according to the amplitude of the AC voltage, and changing a voltage of the first node to the second predetermined voltage such that the second predetermined voltage is independent of the amplitude of the AC voltage;

a second switching means, connected to the first node, for controlling a current flow to the system according to the switch control signal;

a first transformer, connected to the second switching means, for transforming the second predetermined voltage into the first predetermined voltage;

a second filter for filtering out noise from the first predetermined voltage; and a second rectifier for rectifying the first predetermined voltage.

12. The power supply control circuit according to claim 10, the subsidiary power supply comprising:

a first transformer for receiving the second predetermined voltage and for transforming it into a third predetermined voltage;

a first filter for filtering out noise from the third predetermined voltage;

a first rectifier for rectifying an output of the first filter; and a regulator for regulating an output of the first rectifier and for outputting the power voltage.

13. The power supply control circuit according to claim 10, the controller comprising:

a first control unit for receiving the power voltage and for outputting first and second control signals according to a user's control; and a second control unit for outputting the switch control signal according to an output of the first control unit.

14. The power supply control circuit according to claim 13, the first control unit comprising:

a first switching means for providing an output according to the user's control;

a microcomputer for receiving the power voltage and for outputting a shut-down signal and an wake-up signal according to an output of the first switching means;

a first light emitting diode which is turned on and emits light in response to the microcomputer outputting the shut-down signal;

a first phototransistor for outputting the first control signal according to an emitted light output of the first light emitting diode;

a second light emitting diode which is tuned on and emits light in response to the microcomputer outputting the wake-up signal; and a second phototransistor for outputting the second control signal according to an emitted light output of the second light emitting diode.

15. The power supply control circuit according to claim 13, the second control unit comprising:

a start latch unit, connected to a first node of the main power supply, for outputting a power according to the second control signal;

a power blocking unit for blocking the power according to the first control signal;

a switching control unit for outputting the switch control signal according to the power selectively outputted from the start latch unit; and a diode for preventing a reverse current from flowing from the switch control unit to the start latch unit.

16. The power supply control circuit according to claim 15, further comprising a subsidiary winding of a first transformer, the switching control unit selectively receiving subsidiary power from the subsidiary winding of the first transformer instead of power from the start latch unit when a switching means is turned on.

17. The power supply control circuit according to claim 14, the third switching means comprising a pushbutton switch.

* * * * *